Feb. 20, 1968  HARUO YASUKOUCHI  3,369,671
GOOSENECK JIBS OF CRANE BOOMS
Filed Oct. 7, 1966  9 Sheets-Sheet 1
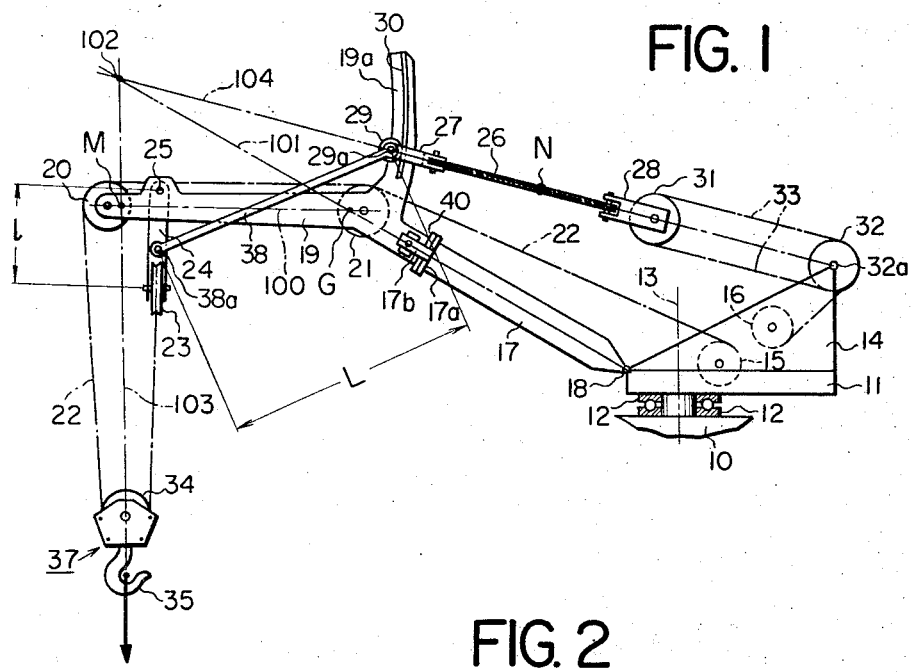
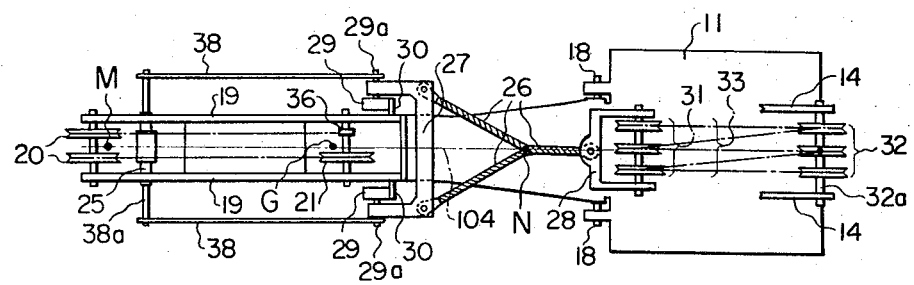
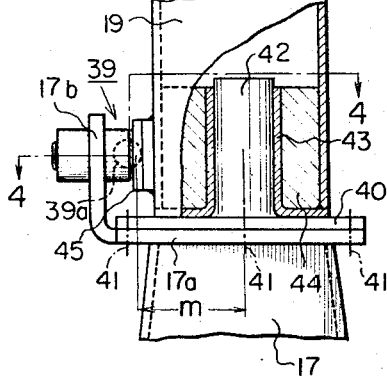
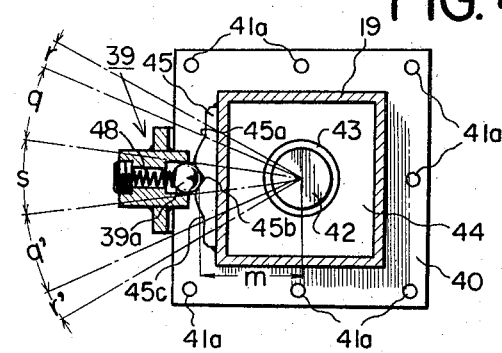
INVENTOR.
HARUO YASUKOUCHI

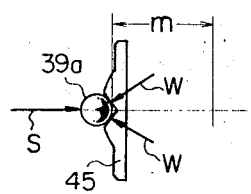
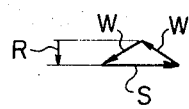
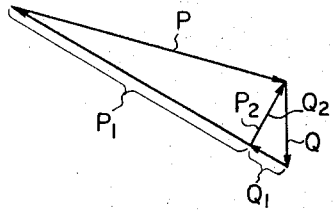
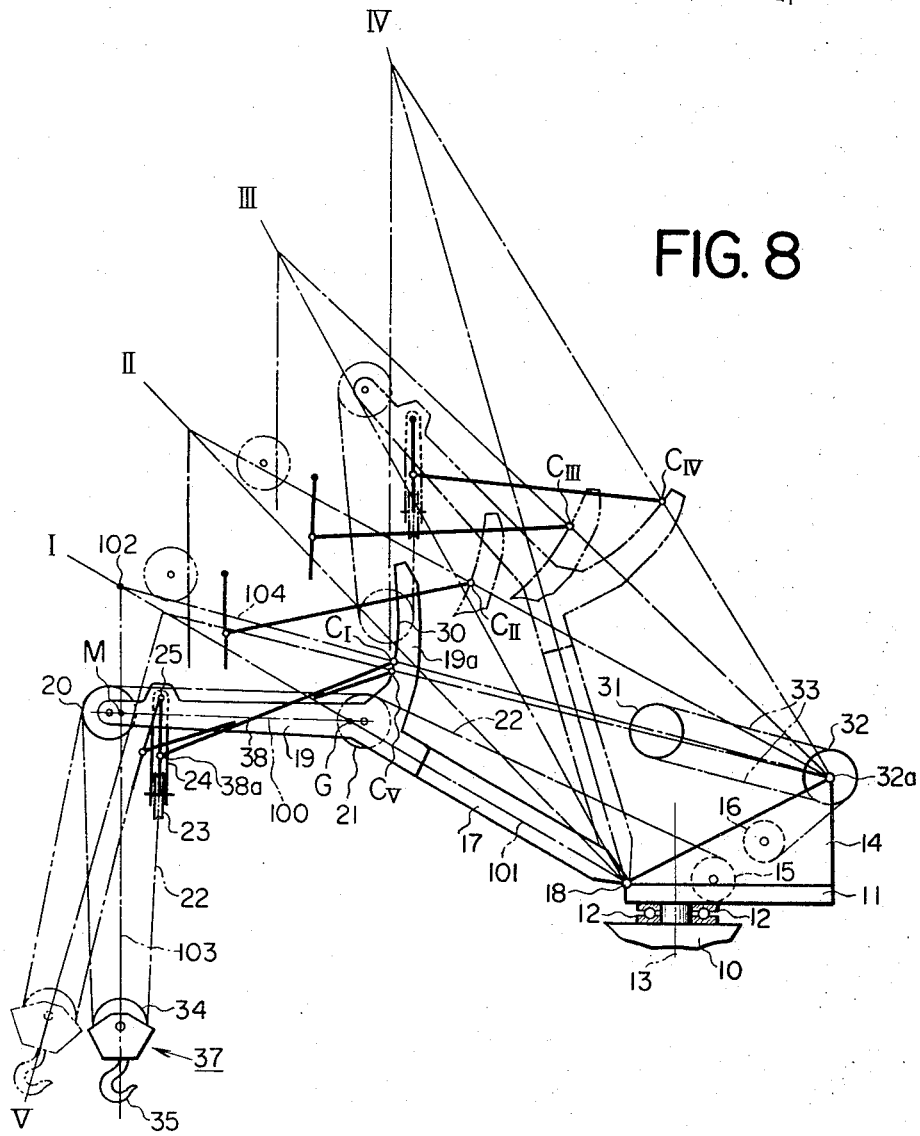

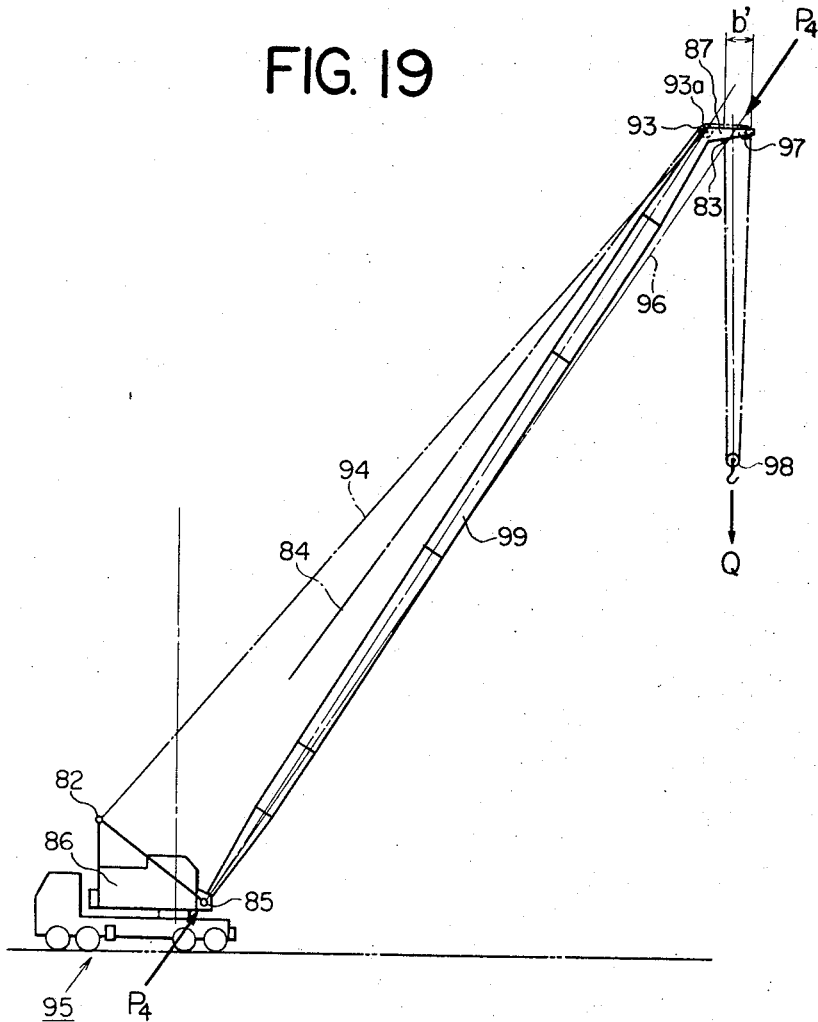

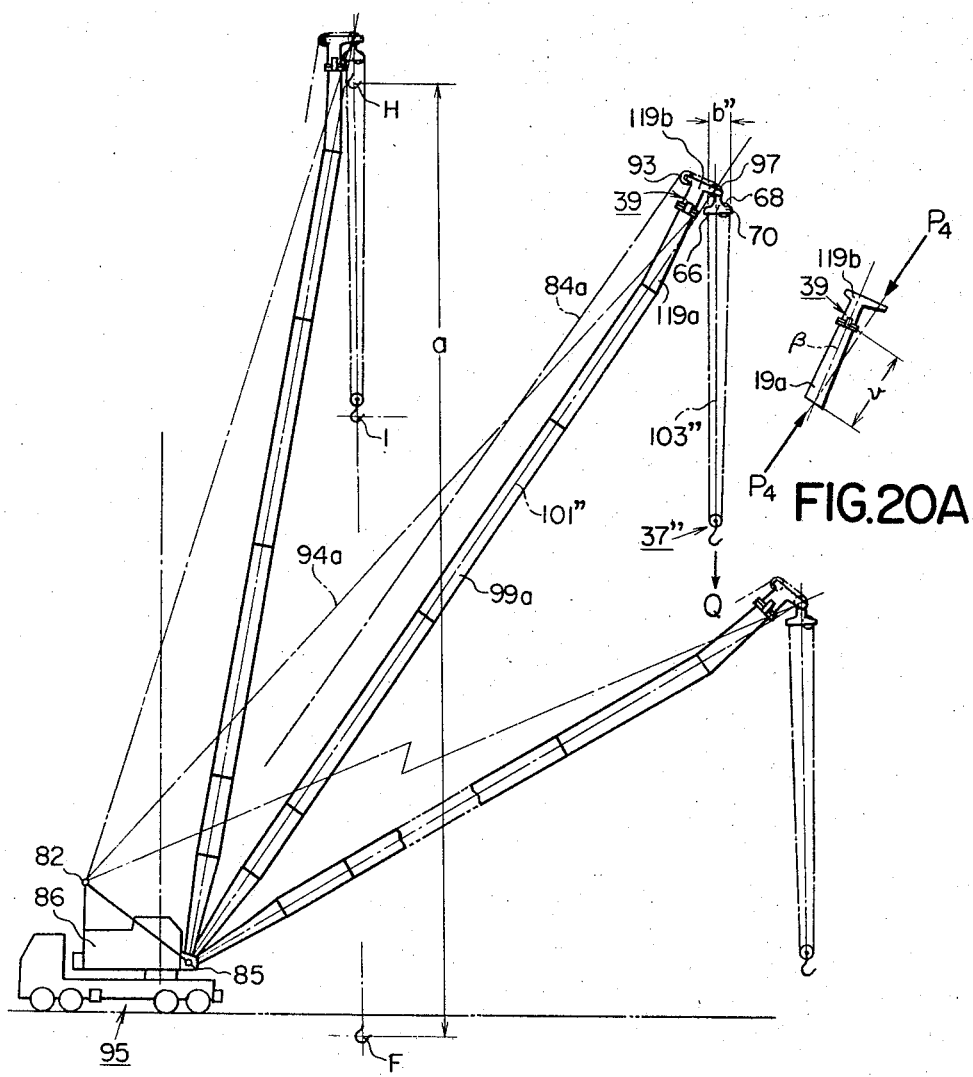

Feb. 20, 1968  HARUO YASUKOUCHI  3,369,671
GOOSENECK JIBS OF CRANE BOOMS
Filed Oct. 7, 1966  9 Sheets-Sheet 9

United States Patent Office 3,369,671
Patented Feb. 20, 1968

3,369,671
GOOSENECK JIBS OF CRANE BOOMS
Haruo Yasukouchi, 596, Matsudo, Shinden,
Matsudo-shi, Chiba-ken, Japan
Filed Oct. 7, 1966, Ser. No. 585,150
Claims priority, application Japan, Oct. 11, 1965,
40/62,573; Feb. 12, 1966, 41/8,177
5 Claims. (Cl. 212—59)

ABSTRACT OF THE DISCLOSURE

A gooseneck jib is pivoted to a crane boom about the longitudinal axis of the boom and normally held from pivotal rotation by a spring loaded detent. The derrick rope system is connected to the gooseneck boom by a roller guided on a curved guide rail of the gooseneck boom.

This invention relates to improvements in and relating to gooseneck jibs of crane booms.

Conventional booms of the above kind can be divided substantially into two types, more specifically the straight jib boom and the gooseneck type. One grave drawback of the later type, when seen from its dynamic characteristic, resides in eccentrically induced stresses in the boom which may develop in the course of operation of the crane, resulting in the employment of a heavier design of the boom. From this reason, straight jib booms have been utilized for crane jobs in various industries substantially exclusively over gooseneck booms.

On the other hand, gooseneck jibs have, aside from the aforementioned drawback, the following technical advantages in their usage:

(a) Even in the case of shorter booms, such as wrecking and common cranes, they may provide wider working space around the root of the boom, thereby attaining a very convenience in handling bulky lifting loads, especially when it is desired to bring them nearer to the root of the boom.

(b) In the case of considerably long boom, such as that of high-lift crane, climbing crane or the like, the point sheave can be so optimumly arranged that the distance between the depending points of hoisting wire rope passes as measured at the supporting gooseneck is large enough so as to avoid possible tangling of the hoisting wire rope or ropes.

On the other hand, the gooseneck boom represents generally, regardless of its length, the following grave drawbacks:

Considerable bending or eccentric compressive stresses are induced in the boom by the lifting load, resulting in heavier construction which must be necessarily adopted, as already hinted briefly hereinbefore.

With the swinging movement of the boom accelerated or decelerated, as the case may be, or the lifting load is swung horizontally to more or lesser degree and a corresponding horizontal load component is impressed, the boom will be subjected additionally to twisting stresses.

The main object of the present invention is to provide highly improved gooseneck booms, capable of substantially obviating aforementioned drawbacks inherent in the comparative conventional technique, while preserving the aforementioned advantages.

These and further objects, features and advantages of the present invention will become more clear when read with the following detailed description of several preferred embodiments of the invention with reference to the accompanying drawings illustrative of these embodiments only by way of example and thus in no limiting sense, and comparative conventional arrangement for comparison.

In the drawings,

FIG. 1 is a schematic side view of a gooseneck boom as a first embodiment of the invention.

FIG. 2 is a top plan view thereof.

FIG. 3 is an enlarged and longitudinal sectional view of the connecting part of the gooseneck proper to a main boom of a jib crane, said connection allowing rotation of the gooseneck relative to the main boom in the concentric manner.

FIG. 4 is a cross-sectional view taken on the line IV—IV in FIG. 3.

FIGS. 5–7 are several vector diagrams illustrative of acting forces appearing at several places in the arrangement shown in the foregoing.

FIGS. 8–9 are two skeleton views illustrative of the working mode of the gooseneck boom shown in the foregoing, wherein the hoisting hook is of 4-rope reeving type and the working mode is shown in four different operating positions of the gooseneck.

FIG. 19 is a schematic side view of conventional truck crane fitted with conventional gooseneck boom mechanism.

FIG. 20 is a schematic side view of an improved truck crane fitted with an embodiment of gooseneck boom according to this invention, wherein, however, the boom with its main boom has been shown in three different working positions for better understanding of the novel working mode in a comparative manner.

FIG. 20A is an explanatory schematic view illustrative of the loading conditions of the gooseneck shown in FIGS. 20–23.

Figure 9:
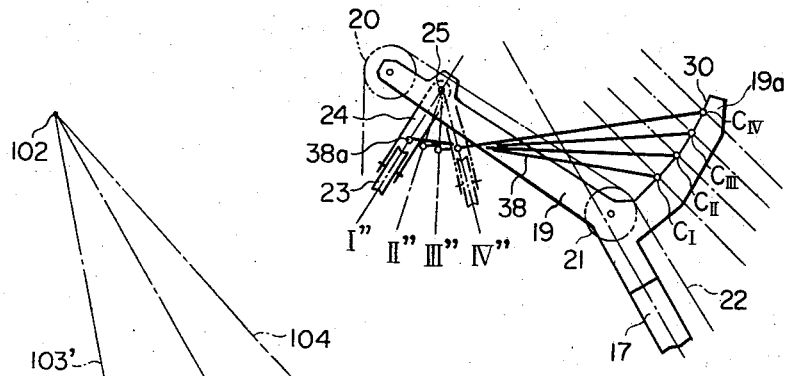

Now turning to the accompanying drawings, especially FIGS. 1 and 4, a first embodiment of the invention will be described in detail.

In these figures, numeral 10 denotes a conventional lower frame, drawn in a highly simplified manner, of a jib crane, not shown. A conventional turntable 11 is turnably mounted on the frame 10 about an imaginary axis 13 through antifriction bearing means at 12, a A-frame or upper frame 14 being mounted fixedly and integrally with the turntable. Although the bearing means are not shown for simplicity in the drawing, a conventional hoisting drum 15 and derrick drum 16 are mounted rotatably on the upper frame 14.

Conventional main boom 17 is pivotably connected at its root end to the turntable 11 by means of boom foot pins 18, while a gooseneck boom 19 is pivotably mounted on the top end of the main boom. Point sheave means 20 and guide sheave 21 are rotatably mounted on the gooseneck at a considerable distance from each other. From the gooseneck 19, a bracket 24 is dependingly and pivotably provided at 25 and an equalizer sheave 23 is rotatably mounted on the bracket, the latter sheave serving to equalize the tension in 4-part line of hoisting wire rope 22. Numeral 26 denotes pendant rope system which is tensioned between a pair of yokes 27 and 28.

The former yoke 27 is provided wtih a pair of rollers 29 which are kept in shiftable engagement with guide rail means 30 rigidly formed on gooseneck arm at 19a. The latter yoke 28 carries thereon a plurality of, herein shown three by way of example, freely rotatable guide sheaves, generally denoted 31. On the upper frame 14, a corresponding number of further guide sheaves, herein shown again three by way of example, freely rotatable sheaves, generally denoted 32, are mounted. As is conventional, a derrick rope 33, shown only schematically by a chain line, is fixed at its one end with the derrick drum 16 and taken out therefrom for threading around the two sets of guide sheaves 21 and 32 is a successive order, while the other end of rope 33 is fixed to a proper position on the upper frame 14, as is known in the art.

Hoisting wire rope 22, again shown only schematically by a chain line, is fixed at its one end to the hoisting drum 15, and then threaded around sheaves 21, 20, 34, 23, 34 and 20 and then fixed at its another end to a properly selected fixing position as at 36 (see FIG. 2) on the gooseneck 19. As may be well supposed, the hook block, generally denoted 37 and carrying a loading hook 35, comprises a pair of hook sheaves 34, not shown in FIGS. 1 and 2.

A pair of connecting bars 38 are mounted pivotally at both ends. More specifically, one end of each of the connecting bars 38 is pivotally connected with related pivotable bracket 24, by means of pin 38a, while the opposite end of the bar 38 is pivotally connected with the shaft 29a of the related one of shiftable rollers 29.

Next referring to FIGS. 3 and 4, the main boom 17, which has preferably a rectangular cross-section, is formed rigidly at its upper end with a mounting flange 17a which is provided again rigidly with a supporting arm 17b, carrying thereon fixedly a detent mechanism, generally denoted 39, comprising a spring-loaded stop ball 39a. A base plate 40 is rigidly bolted to the mounting flange 17a by means of a plurality of fixing bolts which are shown in FIG. 3 only schematically by chain lines at 41, while in FIG. 4 these bolts are shown only by the corresponding number of bolt holes 41a. At the diagonal center of the base plate 40, there is provided a pivot shaft 42 which is made integral with the base. A sleeve 43 which is rotatably mounted on the base and around the pivot shaft 42, is made integral with the gooseneck boom 19 at its root portion through the intermediary of an intermediate rigid block 44. On the peripheral surface of the boom 19, there is provided a rigid projection 45 formed integrally therewith and having three engageable recesses 45a, 45b and 45c adapted for positive engagement with stop ball 39a of detent mechanism 39.

When the derrick drum 16 is driven as is conventional in the clockwise direction in FIG. 1, the derrick rope 32 is gradually wound up by the drum and the boom assembly 17 and 19 is raised from its lowermost position I through intermediate positions II and III to the highest position IV as schematically represented in FIG. 8. In the course of this elevating manipulation, the thus induced centrifugal force will act upon the hook block 37 which is thus urged outwardly to the position shown at V in FIG. 8.

In the course of the abovementioned boom-elevating manipulation, an angular displacement of the equalizer bracket 24 relative to the boom assembly 17 and 19 may take place. In the present mechanism, however, this angular displacement will be transmitted through the intermediary of connecting bars 38 to the shiftable rollers 29 which are thus caused to shift in unison with each other along the respective guide rails 30. As will be described hereinbelow, any bending moment otherwise acting in this case upon the main boom 17 can be obviated and the latter may be subjected only to compressive stresses by selecting the relative dimensions and arrangements of said related parts.

Now assuming that the distance between the pivot pin 25 and the similar pin 38a for connecting bar 38 is expressed by "1" and the length of the bar is denoted by "L," the way for determining the curvature and position of the guide rail 30 will be described. It should be noted however that for the purpose of simplicity tensile stresses induced in the hoisting rope 22 caused by a load, not shown, suspended from the hook 35, and frictional losses at pivoted ends of each of the connecting bars 38 and those for related elements therewith have been intentionally neglected.

In FIG. 8, at the position I, 103 denotes a vertical axis which passes through the center of gravity of the handling load, not shown, in its suspended and balanced condition, while 101 represents the longitudinal axis of the main boom 17, intersecting the former axis 103 at 102. Next, connect the intersecting point 102 with the axis 32a of guide roller assembly 32. Further draw an arc with a radius equal to said length "L," taking the intersecting point 102 as the center so as to cut the newly drawn line 104 between the both points 102 and 32a, thus obtaining an intersecting point $C_I$. This point $C_I$ will correspond to the required point on the guide rail 30 when the boom assembly occupies the lowest position I. When the shiftable roller 29 is placed at this point on the rail 30, the lated three axes 101, 103 and 104 intersect with each other at the specific point 102, resulting in the otherwise appearing additional bending stresses reduced practically to nil.

When repeating the aforementioned drawing process at each of the further positions, II, III and IV of boom assembly 17 and 19, similar points $C_{II}$, $C_{III}$ and $C_{IV}$ can be determined, as exemplarly shown in FIGS. 8 and 9. By connecting these points one after another, the position and curvature of each of the guide rails 30 can be provided.

When the aforementioned drawing process is carried out on the basis of the centrifugally urged position V of the hook block 37, a similar point $C_V$ can be determined.

In FIG. 9, the results thus determined are briefly and only schematically illustrated. Additionally, I″, II″, III″ and IV″ illustrate the respective positions of the equalizer bracket 24 in response to the successive positions I, II, III and IV of the main boom 17.

Figure 10:
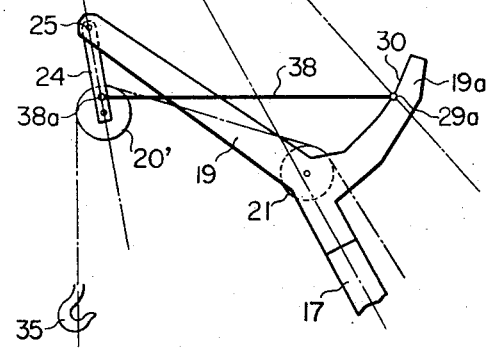
FIG. 10 is a schematic skeleton view of a modified gooseneck, illustrative of its working mode with use of a hook of single rope reeving type.

In the foregoing embodiment, the loading hook block 37 is provided with 4-rope reeving system. In FIG. 10, a considerably simplified arrangement for single rope reeving system is shown by way of example. In this modification, hoisting point sheave 20′ is mounted directly on the pivotable bracket 24, in place of the gooseneck. With this modified arrangement, the desired effects can be equally attained, as shown by the common intersecting point 102 of three imaginary axes 101, 103′ and 104.

Figure 12:
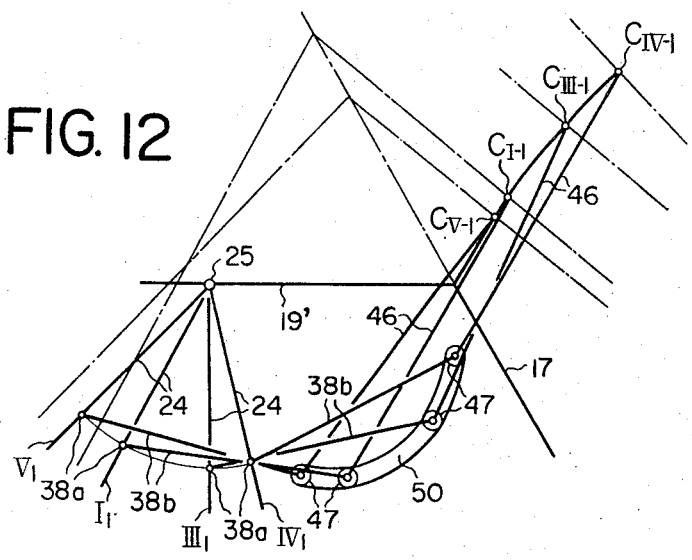
FIGS. 11 and 12 are skeleton drawings of a still further modified form from the first embodiment shown in FIGS. 1–8.
Figure 11:
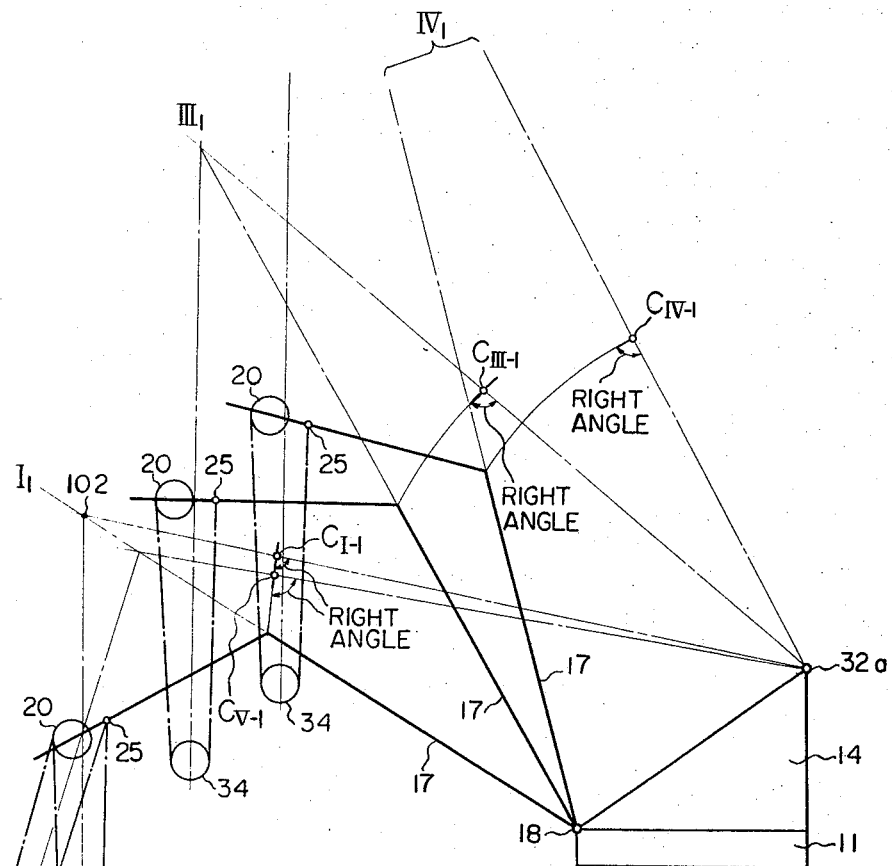

A still further modified arrangement is shown in FIGS. 11 and 12. A further condition is added in that the pendent rope system as a whole will shift with its guide rollers 29 along the guide rails 30 at right angles to the guide surfaces of the latter. By this measure, the rollers 29 can shift along the guide rails 30 with minimum efforts. In this modified arrangement, however, further connecting bar 46 and follower roller 47 guided by curved cam groove 50 must be additionally provided.

In FIG. 11, reference symbols $I_1$, $III_1$ and $IV_1$ denote corresponding positions of the main boom 17 to those I, III and IV, respectively, shown in FIG. 8. $C_{I-1}$, $C_{III-1}$ and $C_{IV-1}$ represents respective positions on a guide rail corresponding to that shown by 30 in FIG. 1, as determined by the graphical method above-referred to, yet keeping the aforementioned right-angle condition. When the centrifugal deflection of the hook block to a certain position at $V_1$ shown in FIG. 11, a somewhat different point $C_{V-1}$ will be obtained in place of the first point $C_{I-1}$.

Figure 12A:
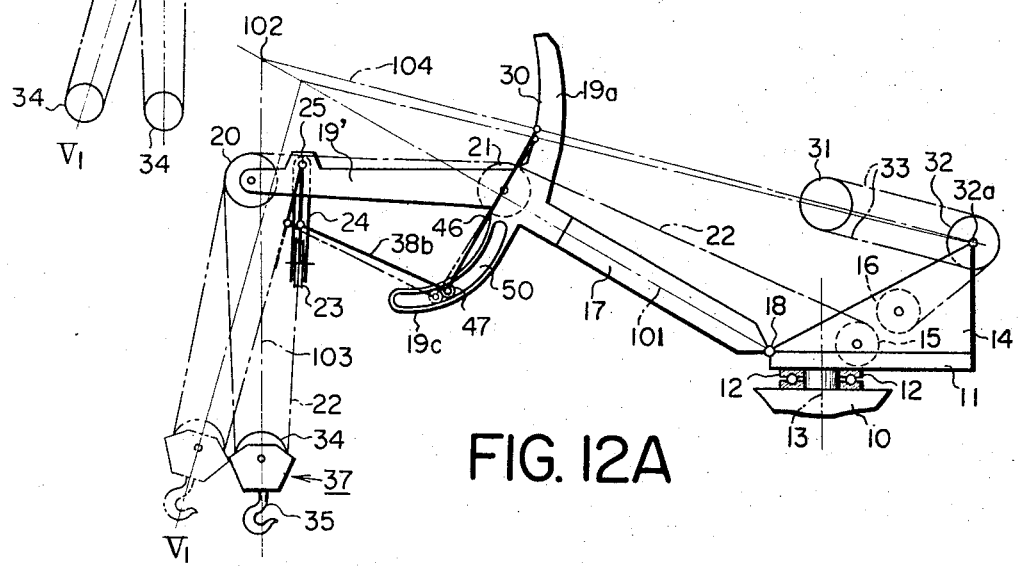
FIG. 12A is a side view of the arrangement substantially shown in FIG. 12, yet in a more specific and detailed manner.

In FIG. 12, modified connecting bar 38b is shown in ints different positions corresponding to that shown in FIGS. 1–2 and 8 by numeral 38, said modified bar 38b carrying at its one end the aforementioned follower roller 47 and at the same time linked with the second connecting bar 46, as shown. The roller 47 is guided in an elongated and curved cam groove 50 which formed on a second arm 19c, as more specifically shown in FIG. 12A.

In the foregoing several embodiments, a mechanical link mechanism has been employed. However, in practice, a hydraulic system or even electrically operating system can be employed in place of the mechanical link mechanism for the same purpose.

Next, referring to FIGS. 3–7, an overload relief mechanism provided on the connecting part between the main boom 17 and gooseneck boom 19 will be described more in detail.

In the normal working condition of the boom assembly 17 and 19, any rotation of gooseneck 19 relative to the main boom 17 positively prevented from taking place, as may be easily supposed by reference to FIGS. 3 and 4, wherein detent ball 39a is kept in engagement with the central stopper recess 45b under pressure exerted by pressure spring 48.

When a certain amount of turning torque is applied from the hoisting load to the gooseneck 19, urging the latter to rotate relative to the main boom 17, the ball 39a is pushed out from the engaging recess 45b against the action of pressure spring 48, thus the detent mechanism 39, when observing its ball 39a as its representative constituent, is shifted relatively upwards or downwards in FIG. 4 from the click zone s into the neighboring zone q or q', as the case may be. This relative and pivotal movement of gooseneck 19 is limited by the engagement of the ball 39a with stopping recess 45a or 45c. Therefore, the pivotal movement is allowed within a predetermined angular range (q+s+q'). So far as the pivotal movement of the gooseneck 19 is limited within this allowable range and when a returning torque provided is large enough to overcome the spring action by the hoisting load, the gooseneck will return to its initial detented position shown.

When showing graphically by reference to FIGS. 5 and 6 the way to determine the resistance provided by the mechanism 39, vector S represents the resilient urging force provided by pressure spring 48 and vectors W denote in combination the reaction appearing at the recess 45b. When the radius of the projection 45 at the engaging position of the ball with the central recess 45b, as measured from the central axis of pivot shaft 42 taken as the center, is expressed by "m" as shown, the resistance force in the circumferential direction can be easily determined by "R" shown in FIG. 6, by consulting with a closed vector triangle comprising S, W, and W as shown. The required resistance torque will amount to Rxm, which may be selected therefore as desired by properly dimensioning the urging spring 48, the included angle of detent recess 45b and the radius m of the projection 45.

In the following, the effective damping and limiting performance of the aforementioned detect mechanism against excessive horizontal load component as frequently appearing in the course of handling the hoisting load, will now be described. It is commonly known to those skilled in the art such horizontal components as above referred to will appear especially when the jib boom is accelerated or decelerated in the course of turning or derrick movement, or alternatively when the hoisting load is drawn considerably in the horizontal direction.

When denoting the hoisting load by Q, the horizontal load component is $\alpha Q$, $\alpha$ representing a coefficient being taken generally as 5–20% depending upon the kind of crane, the working condition thereof and the skill of the crane driver. When there is fear that an abnormally violent operation of the crane will be executed by non-skilled personnel, the horizontal load coefficient must be selected to a considerably larger value which means naturally a corresponding economical loss. The purpose of the provision of the aforementioned overload relief mechanism is to limit the said coefficient to a practical and economical value, regardless of the skill of the crane operator.

In FIG. 7, a vector diagram is shown, wherein vector P denotes the hoisting load acting upon the hook block 37, the main component of which acting in the axial direction 101 of the main boom 17 is expressed by a combined vector $Q_1$. When expressed the pendent rope load by P and the component in the same axial direction by $P_1$, a combined vector corresponding to $(P_1+Q_1)$ will act in that direction. The lateral component of the hoisting load Q is expressed by a vector $Q_2$ which is qual to the lateral component $P_2$ of the pendent rope load P. The horizontal hoisting load component may be expressed by $\alpha Q_2$ when employing the aforementioned definition.

Figure 13:
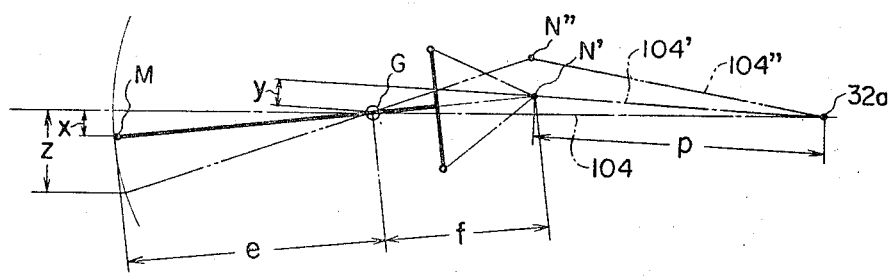
FIG. 13 is a skeleton top plan view of the arrangement shown in FIG. 2, yet in a somewhat different working position.

FIG. 13 is substantially a simplified skeleton representation of FIG. 2, wherein however the gooseneck is shown in its somewhat twisted position relative to the main boom. Now referring to FIGS. 7 and 13, and considering the balanced condition of several acting forces, the following relation will be obtained:

$$\alpha Q_2 xe = Pxy$$

$$y = x\frac{f}{e} x \frac{p+f}{p}$$

Thus, $$x = \frac{\alpha \cdot e^2 \cdot p}{f \cdot (p+f)} \cdot \frac{Q_2}{P}$$

In FIG. 13, point M is the intersection between the axis 103 of the suspended load and the longitudinal axis 100 of the main part 19b of gooseneck 19. Point G is the intersection between both the axes 100 and 101. In this case, the gooseneck has been somewhat twisted relative to the main boom 17 as shown hereinabove, the intermediate junction point at N (FIG. 2) of the pendent rope system has been shifted a short distance to a certain point at N' in FIG. 13. Point N' denotes the farmost point which corresponds to the maximum possible twist of the gooseneck relative to the main boom. The correspondingly shifted positions of pendent rope axis 104 are also shown by 104' and 104", respectively. Several distances e, f, p, x, y and z are shown also in FIG. 13.

As observed from practical experiments, the resistance against the horizontal loading component acting at the point M when considering the balance force system M–G–N'–32a shown in FIG. 13.

$$\left(\frac{\alpha \cdot e^2 \cdot p}{f(p+f)} \cdot \frac{Q_2}{P}\right)n$$

where n being a certain exponent between 1.5 and 2.5. When the value of e is selected beforehand to a predetermined proper one and by adopting properly selected values of f and p, the resistance force against the possible maximum of horizontal loading component acting at the point M can therefore be determined. Therefore, the maximum possible twisting load acting on the main boom caused by the horizontal load component to act upon the gooseneck may be easily anticipated.

Figure 15:
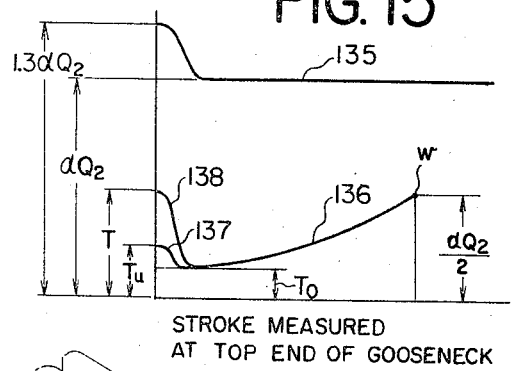
FIG. 15 is a diagram illustrative of the novel mode of damping and limiting possible horizontally acting load components.

In FIG. 15, the resistance torque against the horizontal load in the above meaning is plotted against the stroke of the tip end of the boom assembly, the scales being however taken only optionally. When assuming the torque be $\frac{1}{2} \cdot \alpha Q_2$, a corresponding torque curve shown at 136 may be obtained. In this figure, $T_u$ and $T_o$ represent static and dynamic friction coefficients, respectively, at the hinge pin connection between the gooseneck and the main boom, while T denotes the twisting resistance in the click mechanism 39.

When the detent mechanism is dispensed with, the resistance torque curve will become as shown by the combined curve 137–136. With use of the detent mechanism, an improved curve such as shown by 138–136 may be attained. The normal torque curve of $1.3\alpha Q_2$ will be such as shown by 135. In this case, the factor 1.3 is an impact factor to be normally adopted in connection with the horizontal load component.

Figure 14:
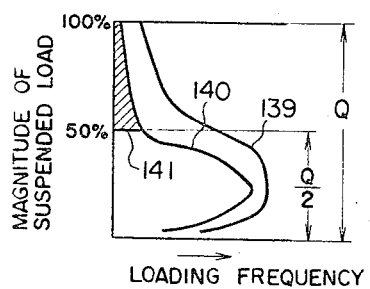
FIG. 14 is a diagram illustrating the relation between the loading frequency and the magnitude of loads by way of representative example.

In FIG. 14, the frequently met magnitudes of hoisting load have been plotted against the loading frequency as observed from experience. Curve 139 shows mean results of practical hoisting jobs, while curve 140 represents improved results carried out by a skilled crane operator. Operators are generally careful in handling heavier loads and thus the hatched area or so appears to be relatively small. Even with most careful operations of a crane carried by a highly skilled operator, cases to handle 100%-loads could not be avoided in the conventional technique. With use of the aforementioned unique detent mechanism, a highly improved loading curve 141–140 can be easily attained and therefore a highly economized design of the boom assembly may be positively adopted, when relying upon the novel teaching as suggested by the present invention.

Figure 16:
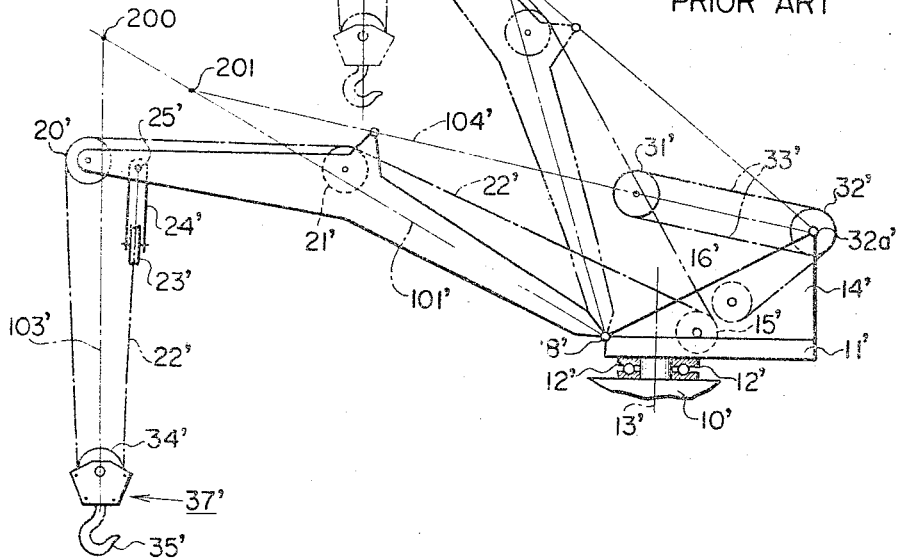
FIG. 16 is a schematic and explanatory side view of a conventional crane boom with gooseneck jib shown in two different working positions of the boom.

In FIG. 16, a comparative conventional gooseneck boom arrangement is shown, wherein corresponding parts and axes are represented by similar reference numerals or symbols attached with a prime. As seen clearly from the figure, three main axes 101', 103' and 104' can not intersect at a common point. In the position I', there are two intersecting points 200 and 201. In the similar way, in the highest position IV', there are also two intersecting points 200a and 201a. It will be clear that with use of such conventional gooseneck boom arrangement, considerable twisting load will be imposed upon the main boom as was referred to.

Figure 17:
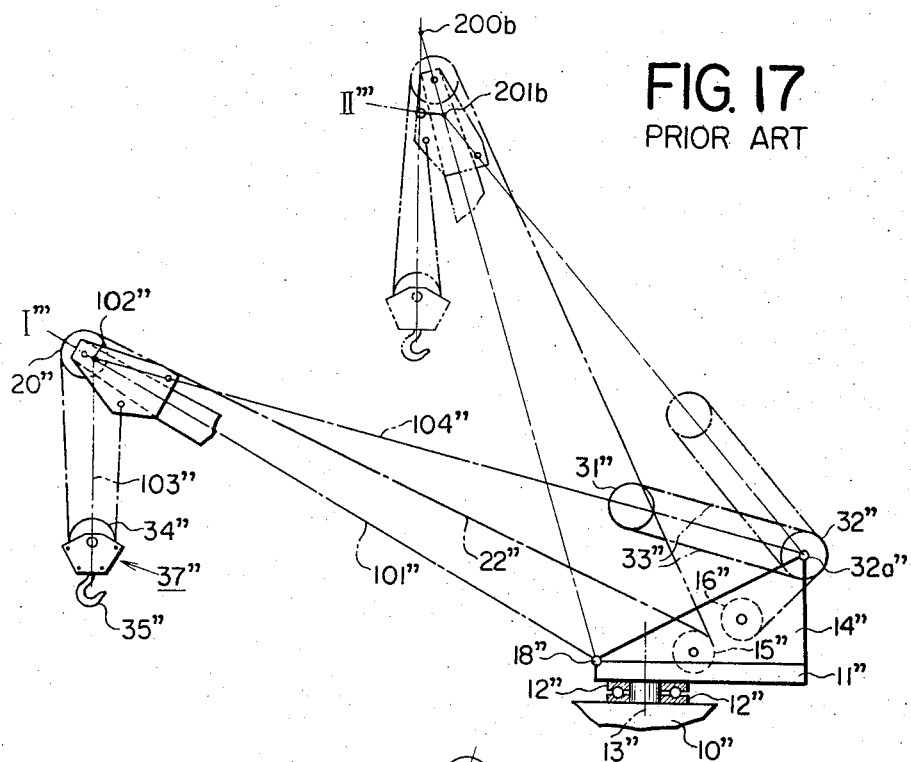
FIG. 17 is a schematic and explanatory side view of a conventional truck crane boom shown in two different working positions of the boom.

In FIG. 17, a conventional straight boom arrangement is schematically shown for comparison. In the lowermost position I'' of the boom assembly, three axes 101'', 103'', and 104'' intersect with each other at one and the same intersecting point 102'' which is similar to the point 102 shown in FIGS. 1 and 8. With the boom assembly brought into its highest position at II'', two intersecting points 200b and 201b appear as in the first conventional arrangement shown in FIG. 16. In this case, also, the aforementioned technical drawback will be encountered substantially over its entire working range.

Figure 18:
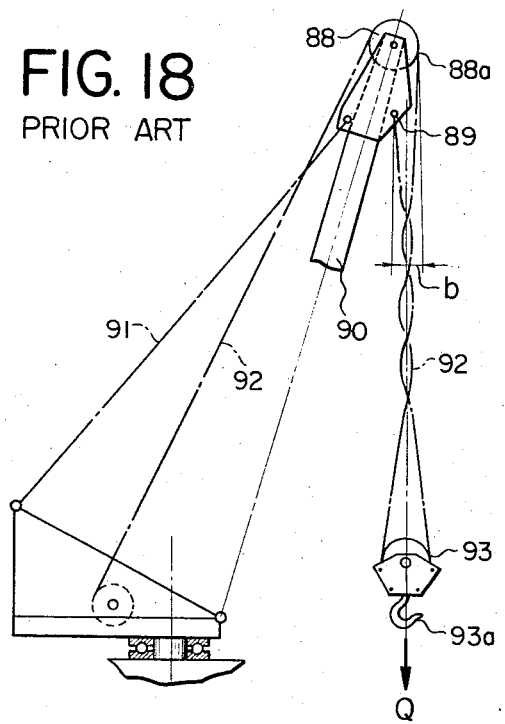
FIG. 18 is an explanatory and high simplified side view illustrating of the intertwining behavior of hoisting wire rope as frequently observed with use of conventional crane boom.

In FIG. 18, a further example of conventional straight jib crane is shown, wherein 90 denotes straight boom; 91 derrick wire rope; 92 hoisting wire rope which is threaded around point sheave 88 and hook sheave 93 and finally fixedly attached to a fixing point 89 provided at the top portion of the elongated boom 90.

As will be seen, the depending passes of the hoisting rope 92 are frequently tangled and twisted during the handling of the load Q suspended from hook 93a, on account of smaller distance b as measured between hoisting rope passes at the upper end of the load-suspending rope system, or more specifically between fixed point 89 and the outside periphery at 88a of the point sheave 88, when seen in the horizontal direction.

In a conventional high-lift truck crane 95 shown in FIG. 19, a long boom 99 is pivotably mounted at 85 on the upper turnable frame 86 of the truck crane 95. At the upper end of the boom 99, there is provided a gooseneck jib 87 formed integrally therewith and extending substantially in the horizontal direction when the boom occupies the position shown in the drawing. On the top end of the boom 99, there is provided a guide sheave 93 supported rotatably on a shaft 93a which is mounted in turn fixedly on the boom top. Derrick wire rope 94 extends from a derrick drum, not shown, mounted on the upper frame 86, through guide sheave mounted again at 82 thereon to the shaft 93a, where the rope end is fixed thereto.

Hoisting rope 84 extends from a hoisting drum, not shown, mounted on the upper frame 86, threaded around guide sheave 93, point sheave 97 on gooseneck jib 87 and hook sheave 98 suspended therefrom to fixed point 83. By adopting a longer gooseneck jib so as to increase the maximum possible distance b', which corresponds to the distance b shown in FIG. 18, the aforementioned rope tangling may be avoided. In compensation thereof, however, considerable twisting load may be imposed upon the main boom 99 from the same reason as was described hereinbefore by reference to FIGS. 16–17. In this case, eccentrically acting compressive forces $P_1$ are applied along an imaginary line extending between two points 83 and 85.

FIGS. 20–20A represent a truck crane provided with a long boom, yet embodying the principles of the invention is shown as a further embodiment thereof. In this embodiment, numerals 82, 85, 86, 93, 95 and 97 represent the same constituents as in FIG. 19 and therefore no further description thereof would be necessary.

Figure 22:
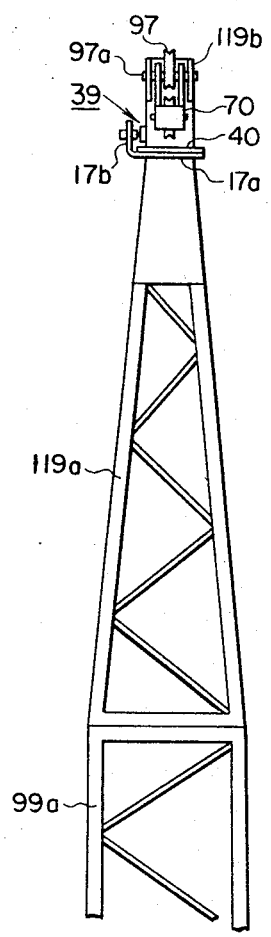
FIGS. 21, 22 and 23 are a schematic and enlarged front-, a left-hand- and a right-hand side views of the gooseneck shown in FIG. 20, respectively.
Figure 21:
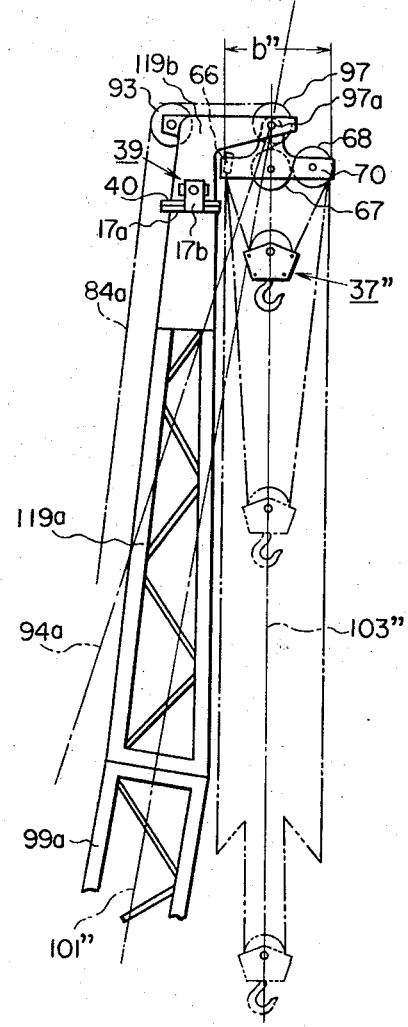
Figure 23:
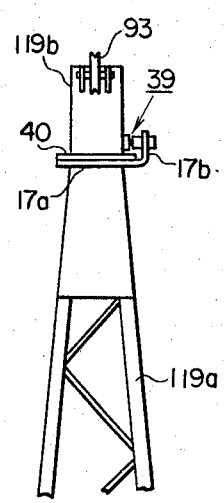

The elongated straight boom at 99a which is similar to that shown by 99 in FIG. 19 is also hinged at 85 to the upper frame 86. The gooseneck comprising a main part 19a rigidly connected with the top end of the boom 99a and extending therefrom at an upwardly directing included angle $\beta$ as shown in FIG. 24, and a top part 19b which is rotatably connected with the main part 19a about the longitudinal axis thereof by means of turnable and detent connection similar to that shown in FIG. 3 and described in detail by reference to that figure hereinbefore. This connection mechanism is only schematically shown in FIGS. 22–23, wherein same reference numerals 17a, 17b, 39 and 40 are shown for guidance. Guide sheave 93 is mounted on the gooseneck top 19a on the lefthand end thereof when seen in FIG. 20, while point sheave 97 is mounted at the right-hand end of the gooseneck top. Hanger member 70 having substantially an inverted T shape is suspended from the shaft at 97a of the point sheave. The upper end of derrick wire rope 94a is fixed in this case to the stationary sheave shaft 97a, as will be most clearly seen from FIG. 21.

Hoisting wire rope 84a is threaded around guide and point sheaves 93 and 97, guide sheaves 67 and 68 on hanger member 70 and hook sheave 98a, and fixed with its extreme end to a fixing point 66 formed on the same member 70. As most clearly seen from FIG. 21, the longitudinal axis 101' of the main boom 99a passes through the sheave shaft 97a and the longitudinal axis 103' of the hoisting rope system containing the hook block 37' passes equally through the sheave shaft 97a. The central and longitudinal axis of the main part of the derrick wire rope system which axis may be considered to be equal to the derrick wire rope 94a per se, passes again through the sheave shaft 97a which can be therefore deemed in this case to be the sole intersecting point 102 shown in FIG. 1 and described in detail referring thereto hereinbefore.

By comparing the relative position of the related parts of the present embodiment at several different positions VI, VII and VIII of the boom system shown in FIG. 20, same effects as set forth hereinbefore by reference to FIGS. 1–8 and 13–15 can be again realized without difficulty. The positions VI, VII and VIII represent the lowermost, an intermediate and the highest position of the boom, respectively. Positions F, I and H represent the lowest, an intermediate and the highest position of the hook block 37", respectively. As seen, the novel effects are not changed with different positions of the hook block.

"$a$" represents the overall lift of the truck crane. The distance $b''$ which corresponds to those denoted by $b$ and $b'$ in FIG. 18 and 19, respectively, must preferably be chosen to $\frac{1}{80}$–$\frac{1}{50}$ of the overall lift "$a$." After determined thus the dimension $b''$, the hanger member 70 is dimensioned properly so as to adapt it to the said dimension $b''$. Finally, the length $v$ and inclination $\beta$ are properly determined so as to avoid possible interference with an imaginary vertical line drawn through the fixed point at 66 of hoisting wire rope 84a on the member 70 with the main boom 99a positioned at its highest position VIII.

In this case, also the main boom 99a is subjected only by compressive forces as hinted by $P_4$ in FIG. 20A.

Of course it should be understood that there may be various different embodiments of the device without departing from the scope of the present invention.

Having now particularly described and ascertained the nature of my said invention, and in what manner the same is to be performed, I declare that what I claim is:

1. A gooseneck jib arrangement of a crane boom, comprising; a carrier, a main boom pivotally supported by said carrier, a gooseneck boom connected with said main boom, a derrick rope system connected with said gooseneck boom for derrick operation of the main and gooseneck assembly, a shiftable roller at the end of the derrick rope system connected to the gooseneck boom, the shiftable roller guided on a guide rail formed on the gooseneck boom, a hoisting rope system and a hook block suspended from the gooseneck boom by means of the hoisting rope system, the gooseneck boom being pivotally connected with the main boom to pivot about the longitudinal axis of the main boom, a detent mechanism at the pivotal innerconnection between the gooseneck boom and main boom normally preventing the gooseneck boom from rotating about the axis of the main boom until the detent force is overcome, the longitudinal axis of the main boom, the central axis of the suspended portion of the hoisting rope system, and the central axis of a main working part of the derrick rope system intersecting with each other at a common intersecting point.

2. Gooseneck jib arrangement as set forth in claim 1, wherein there is provided on said gooseneck boom a pivotable bracket which is connected pivotably with said roller by means of a connecting bar.

3. Gooseneck jib arrangement as set forth in claim 1, wherein the gooseneck boom is divided into a main part and a top part and the main part is rigidly connected to the upper end of said main boom and said top part is pivotable connected with said main part.

4. Gooseneck jib arrangement as set forth in claim 3, wherein said top part is formed with a pivotable hanger member carrying at least a guide sheave for said suspended hoisting rope system and a stop point for the terminal end of the same rope system.

5. Gooseneck jib arrangement as set forth in claim 2, wherein the connecting bar is divided into a first element and a second element, and said both elements are pivotably connected by means of a follower roller which is guided by an elongated and curved cam groove formed on a part of said gooseneck boom.

References Cited
UNITED STATES PATENTS

| | | | |
|---|---|---|---|
| 2,183,263 | 12/1939 | Tourneau | 212—58 |
| 2,364,493 | 12/1944 | Ulinski | 212—49 |
| 2,888,151 | 5/1959 | Morris | 212—144 |
| 3,278,045 | 10/1966 | Potter | 212—49 |

EVON C. BLUNK, *Primary Examiner.*

H. C. HORNSBY, *Assistant Examiner.*